United States Patent
Hewins

(10) Patent No.: US 6,303,061 B1
(45) Date of Patent: Oct. 16, 2001

(54) SCULPTURING MATERIAL COMPOSITION

(76) Inventor: Sharon R. Hewins, Box 1990, R.R. #2, Gardiner, ME (US) 04345

( * ) Notice: Subject to any disclaimer, the term of this patent is extended or adjusted under 35 U.S.C. 154(b) by 0 days.

(21) Appl. No.: 08/100,260

(22) Filed: Aug. 2, 1993

(51) Int. Cl.$^7$ .......................... B29C 67/24; B29C 67/00; C08J 3/28

(52) U.S. Cl. .............................. 264/122; 264/119; 524/2; 524/3; 524/5

(58) Field of Search ...................... 524/2, 3, 5; 264/122, 264/119

(56) References Cited

U.S. PATENT DOCUMENTS

| | | | | |
|---|---|---|---|---|
| 3,468,414 | * | 9/1969 | Harris | 106/780 |
| 4,314,036 | * | 2/1982 | Throne et al. | 521/99 |
| 4,472,185 | * | 9/1984 | Wu | 428/404 |
| 5,110,525 | * | 5/1992 | Kolsky et al. | 264/122 |

* cited by examiner

Primary Examiner—Michael P. Woodward

(57) ABSTRACT

A new and improved composition includes a mixture of: a quantity of a nontoxic premixed mixture of ground cellulose-containing material, plaster of paris, and starch preservative; a quantity of a nontoxic water-based adhesive resin; and a quantity of talcum powder. The water-based adhesive resin is preferably a water-based polyvinyl alcohol resin. The composition of the invention may also include a quantity of a colored acrylic paint. In accordance with another aspect of the invention, a method for preparing a composition of the invention is comprised of the steps of: first, mixing together (a) a quantity of a premixed mixture of ground cellulose-containing material, plaster of paris, and starch preservative, (b) a quantity of a water-based adhesive resin, and (c) a quantity of talcum powder to form a precursor material composition; and, second, treating the precursor material composition with microwave energy, such that a treated material composition is formed that has a greater volume and greater pliability than the precursor material composition. After the composition of the invention is microwave-treated, the composition is shaped into an object. The composition of the invention may be manually shaped into an object with the hands of the artist being coated with a mineral-oil-containing composition. Then, the shaped, microwave-treated material composition is cured. The shaped, microwave-treated material composition may be cured at room temperature. Alternatively, the shaped, microwave-treated material composition is cured at an elevated temperature in an oven.

4 Claims, 1 Drawing Sheet

SCULPTURING MATERIAL COMPOSITION

BACKGROUND OF THE INVENTION

1. Field of the Invention

The present invention relates generally to materials used by artists and designers and, more particularly, to sculpturing materials.

2. Description of the Prior Art

Materials that are soft and pliable before being cured, and that later become hard and inflexible, after being cured, are well known in the art of sculpturing. Depending upon the specific materials involved, curing may be carried out in a number of ways. With some materials, curing is carried out at room temperature. With other materials, curing is carried out at relatively moderately elevated temperatures such as in an oven. With still other materials, curing is carried at high temperatures, such as in a kiln. Some materials require specific curing environments that may be difficult to provide under certain circumstances. For example, a kiln is an expensive piece of equipment and consumes a lot of energy during operation. In this respect, it would be desirable if a sculpturing material were provided that can be cured in a variety of curing environments.

Some sculpting materials are complex mixtures of substances that are not easily blended or mixed together to form a mixture having a substantially homogeneous consistency and having a substantially homogeneous composition. In this respect, it would be desirable if a sculpturing material were provided that consists of a blend of ingredients that has a substantially homogeneous consistency and a substantially homogeneous composition.

Some sculpturing materials are blends of exotic and hard to find materials. Because of the difficulties in locating such ingredients, such sculpturing materials are essentially unavailable to many sculptors. In this respect, it would be desirable if a sculpturing material were provided that is composed of ingredients that are readily available.

Some sculpturing materials are blends of large numbers of ingredients. Because of the complexities of such compositions, many sculptors avoid using such compositions. In this respect, it would be desirable if a sculpturing material were provided that is a blend of a relatively small number of ingredients.

It is often desirable that an objected that is sculpted be colored. Coloring a sculptured objects can be obtained from two different approaches. One approach is to paint the sculpted object after it is formed. Another approach is to have the sculpting material contain coloring materials. A number of disadvantages are associated with painting a sculpted object after is formation. One problem is the selection of the proper paint that will adhere strongly to the sculpted object. Another problem is the finding the desired color that has the desired adherence characteristics. Because of these problems, the approach of having the sculpting materials containing coloring materials may be preferred.

As mentioned above, sculpturing materials are varied in their composition. Similarly, there is a wide variety of coloring materials. Such variety of materials, increases the possibilities in preparing blends that have incompatible ingredients. In this respect, it may be difficult to discover and blend a compatible combination of sculpturing material and coloring materials. In this respect, it would be desirable if a sculpturing material were provided that is capable of being prepared in a wide variety of readily available and compatible coloring materials.

When not in use, sculpturing materials take up storage space. In order to free up space dedicated to storage and permit the freed up space to be used for other purposes, it would be desirable if the storage space for the sculpturing materials be kept to a minimum. In this respect, it would be desirable if a sculpturing material were provided which required a relatively small storage space in comparison with the space occupied by the sculpturing material when the sculpturing material is in use.

When a sculptor is using sculpturing materials, the hands of the sculptor must often be kept wet with water to permit the hands to readily slide over the work being sculpted. Constant exposure to water in this manner may have deleterious effects on the sculptor's skin. The water leaches out natural skin oils leaving the skin abnormally oil deficient. In this respect, it would be desirable if a sculpturing material were provided which is adapted to being handled by hands of a sculptor that have an oil-based material applied thereto. The presence of the oil on the hands will preclude the natural oils of the hands being leached out by water.

Throughout the years, a number of innovations have been developed relating to materials that can be molded, and the following U.S. patents are representative of some of those innovations: U.S. Pat. Nos. 4,343,727; 5,008,314; 5,017,651; 5,026,792; 5,034,441, and 5,066,693. However, none of these patents address or solve the problems associated with sculpturing materials discussed above.

Still other features would be desirable in a sculpturing material. For example, microwave ovens are very popular sources of efficient heating, and many homes have microwave ovens. In this respect, it would be desirable if a sculpturing material were provided that is capable of being treated in microwave oven.

Generally, sculpturing materials are provided in the form of blocks. For certain purposes, however, it would be desirable if sculpturing materials could be provided in the form of sheets, such that the sheets resemble sheets of cloth.

In making works of art a sculptor may want to employ a variety of techniques for forming the sculpturing materials into the desired shapes. As mentioned above, the sculptor may manually manipulate the sculpturing materials. Alternatively, the sculptor may want to employ a mold for the material. For a sculpturing material to work best with a mold, it is desirable that the sculpturing material expand to some extent during the molding process. When the material expands during the molding process, a sharp, well-defined molded object may be obtained. In this respect, it would be desirable if a sculpturing material were provided that is suitable for both manual forming and forming in a mold.

Thus, while the foregoing body of prior art indicates it to be well known to use sculpturing materials, the prior art described above does not teach or suggest a sculpturing material which has the following combination of desirable features: (1) can be cured in a variety of curing environments; (2) has a substantially homogeneous consistency and a substantially homogeneous composition; (3) is composed of ingredients that are readily available; (4) is a blend of a relatively small number of ingredients; (5) is capable of being prepared with a wide variety of readily available and compatible coloring materials; (6) requires a relatively small space in storage which is in contrast with the relatively large space occupied by the sculpturing material when the sculpturing material is in use; (7) is adapted to being handled by hands of a sculptor that have an oil-based material applied thereto; (8) is capable of being treated in a microwave oven; (9) can be provided in the form of sheets, such that the sheets resemble sheets of cloth; and (10) is suitable for both manual forming and forming in a mold. The foregoing desired characteristics are provided by the unique sculpturing material of the present invention as will be made apparent from the following description thereof Other advantages of the present invention over the prior art also will be rendered evident.

SUMMARY OF THE INVENTION

To achieve the foregoing and other advantages, the present invention, briefly described, provides a new and improved composition includes a mixture of: a quantity of a nontoxic premixed mixture of ground cellulose-containing material, plaster of paris, and starch preservative; a quantity of a nontoxic water-based adhesive resin; and a quantity of talcum powder. The water-based adhesive resin is preferably a water-based polyvinyl alcohol resin. The composition of the invention may also include a quantity of a colored acrylic paint.

In accordance with another aspect of the invention, a method for preparing a composition of the invention is comprised of the steps of: first, mixing together (a) a quantity of a premixed mixture of ground cellulose-containing material, plaster of paris, and starch preservative, (b) a quantity of a water-based adhesive resin, and (c) a quantity of talcum powder to form a precursor material composition; and, second, treating the precursor material composition with microwave energy, such that a treated material composition is formed that has a greater volume and greater pliability than the precursor material composition.

After the composition of the invention is microwave-treated, the composition is shaped into an object. The composition of the invention may be manually shaped into an object with the hands of the artist being coated with a mineral-oil-containing composition. Then, the shaped, microwave-treated material composition is cured.

The shaped, microwave-treated material composition may be cured at room temperature. Alternatively, the shaped, microwave-treated material composition is cured at an elevated temperature in an oven.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining some preferred embodiments of the invention in detail, it is understood that the invention is not limited in its application to the details of the components set forth in the following description. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for providing other compositions and methods for carrying out the several purposes of the present invention. It is important, therefore, that the claims be regarded as including such equivalent compositions and methods insofar as they do not depart from the spirit and scope of the present invention.

Further, the purpose of the foregoing Abstract is to enable the U. S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved sculpturing material which has all of the advantages of the prior art and none of the disadvantages.

It is another object of the present invention to provide a new and improved sculpturing material which may be easily and efficiently manufactured and marketed.

An even further object of the present invention is to provide a new and improved sculpturing material which is susceptible of a low cost of manufacture with regard to both materials and labor, and which accordingly is then susceptible of low prices of sale to the consuming public, thereby making such sculpturing material available to the buying public.

Still yet a further object of the present invention is to provide a new and improved sculpturing material which can be cured in a variety of curing environments.

Still another object of the present invention is to provide a new and improved sculpturing material that has a substantially homogeneous consistency and a substantially homogeneous composition.

Yet another object of the present invention is to provide a new and improved sculpturing material which is composed of ingredients that are readily available.

Even another object of the present invention is to provide a new and improved sculpturing material that is a blend of a relatively small number of ingredients.

Still a further object of the present invention is to provide a new and improved sculpturing material which is capable of being prepared with a wide variety of readily available and compatible coloring materials.

Yet another object of the present invention is to provide a new and improved sculpturing material that requires a relatively small space in storage which is in contrast with the relatively large space occupied by the sculpturing material when the sculpturing material is in use.

Still another object of the present invention is to provide a new and improved sculpturing material which is adapted to being handled by hands of a sculptor that have an oil-based material applied thereto.

Yet another object of the present invention is to provide a new and improved sculpturing material that is capable of being treated in a microwave oven.

Still a further object of the present invention is to provide a new and improved sculpturing material that can be provided in the form of sheets, such that the sheets resemble sheets of cloth.

An even further object of the present invention is to provide a new and improved sculpturing material which is suitable for both manual forming and forming in a mold.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are described preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

Figure 1:
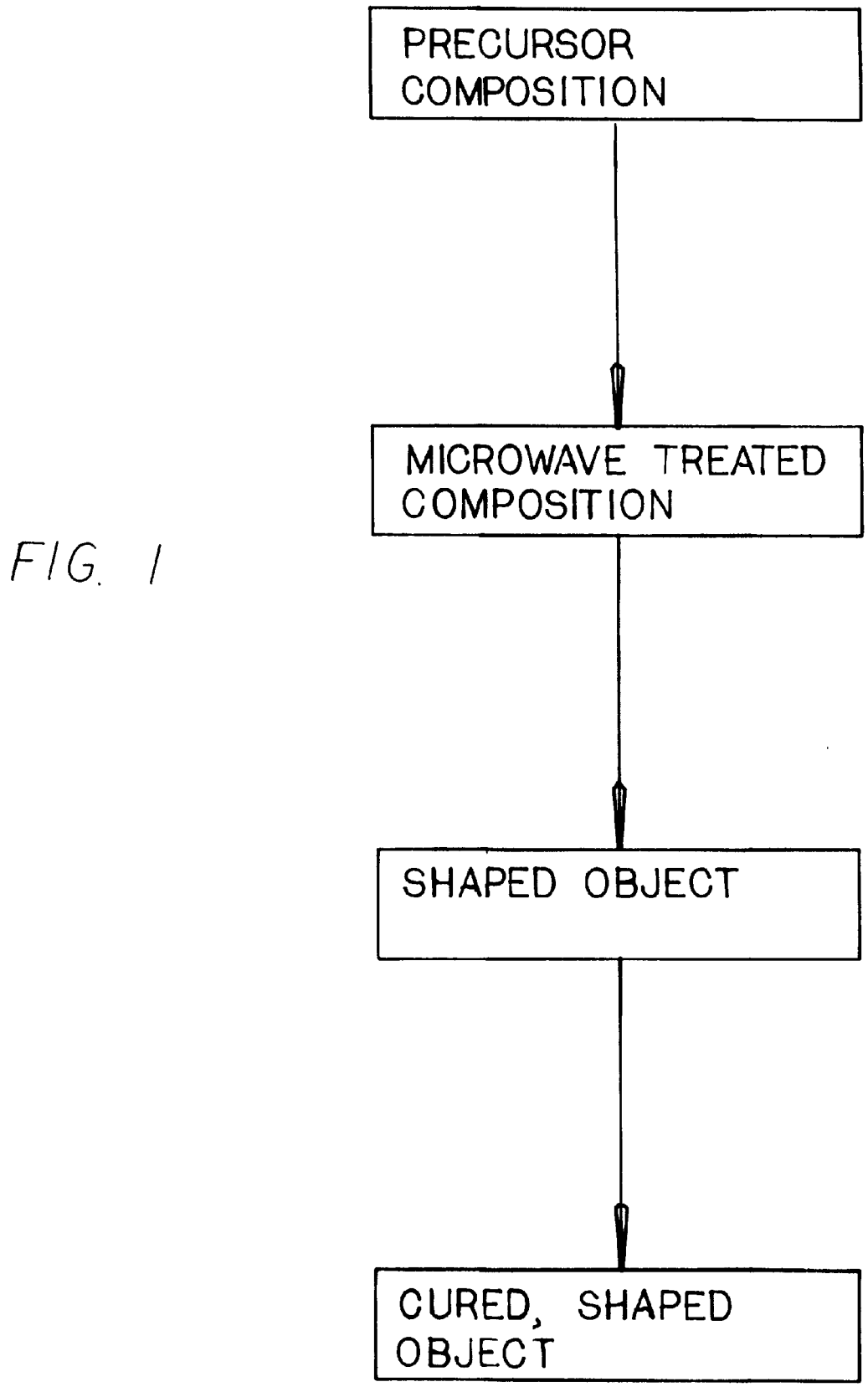
FIG. 1 is a flowchart showing a method of preparing a sculptured object in accordance with the invention.

With reference to the drawings, a new and improved sculpturing material embodying the principles and concepts of the present invention will be described.

In broad terms, a method for producing a cured, shaped object in accordance with the invention is shown in the flowchart in FIG. 1. With reference to FIG. 1, as a first step, the ingredients (described in greater detail below) are blended to form a precursor composition. In step 2, the precursor composition is treated with microwaves, e. g. in a microwave oven, to form a microwave-treated composition. In step 3, the microwave-treated composition is shaped into an object. In step 4, the shaped object is cured to form a cured, shaped object. Although not shown a fifth step may be employed in which the cured, shaped object is painted, machined, sanded, or otherwise further treated.

With respect to the composition, the composition includes a mixture of: a quantity of a nontoxic premixed mixture of ground cellulose-containing material, plaster of paris, and starch preservative; a quantity of a nontoxic water-based adhesive resin; and a quantity of talcum powder.

The premixed cellulose-containing and plaster-of-paris-containing mixture is preferably a quantity of Celluclay II made by Activa Products, Inc, Marshall, Tex. 75670. The premixed mixture is disclosed in U.S. Pat. No. 3,468,414 of Harris, patented Sep. 23, 1969, for Instant Paper Mache in Compressed Form Containing Plaster and a Binder, which is incorporated herein by reference.

The water-based adhesive resin is preferably a water-based polyvinyl alcohol resin. The quantity of a water-based polyvinyl alcohol resin is preferably "Tacky Glue", made by Aleene's, a Division of Artis, Inc., Buellton, Calif., 93427. Another suitable water-based adhesive resin is Elmer's Glue-All, a product of the Borden, Inc., Columbus, Ohio 43215. The water-based nontoxic adhesive resins employed with the invention should pass the nontoxicity requirements set out in ASTM D-4236 of the American Society for Testing Materials for "Practice for Labeling Art Materials for Chronic Health Hazards".

The composition of the invention may also include a quantity of a colored acrylic paint. Any desired colored acrylic paint can be used to produce a composition of a desired color. The color can be blended evenly throughout the material, or the color can be blended unevenly to form a marbleized product.

EXAMPLE

The quantity of the premixed mixture consists of one cup of the premixed mixture. The quantity of the water-based adhesive resin consists of five fluid ounces of a water-based polyvinyl alcohol resin. The quantity of the colored acrylic paint includes one tablespoon, and the quantity of talcum powder includes one tablespoon.

In addition to the Example set forth above, the composition of the invention may include a quantity of mineral-oil-containing material. The mineral-oil-containing material may be cold cream.

In accordance with another aspect of the invention, a method for preparing a composition of the invention is comprised of the steps of, in accordance with the Example above, first, mixing together (a) a quantity of a premixed mixture of ground cellulose-containing material, plaster of paris, and starch preservative, (b) a quantity of a water-based adhesive resin, and (c) a quantity of talcum powder to form a precursor material composition, and, second, treating the precursor material composition with microwave energy, such that a treated material composition is formed that has a greater volume and greater pliability than the precursor material composition. In the method, the composition is treated in a 600–700 watt microwave oven for 30–40 seconds at high power.

The precursor material composition can be provided in block form to be manually formed by a person, or the precursor material composition can be placed in a mold. When the material expands with microwave treatment, the material tends to fill the entire space of the mold to provide a well-formed, molded article.

The composition of the invention is especially useful as a sculpturing material. The material is very pliable and may be shaped at will. In addition, it may be pressed into a mold, such as a cookie mold, and then oven baked for curing. After is baked, the baked material can be painted, such as with an acrylic varnish. A number of molded items have been made which includes a small bear.

The material of the invention can also be sculpted in block form. The sculpted forms can be cured by air drying. A number of items have been made from block form which includes an elephant, an apple, and a pig. Two blocks were used to make a rooster and a pig.

The material of the invention can also be formed into sheets, like a cloth. A press can be used to form the sheets. The sheets don't appear to expand so much in the microwave treatment. The sheets can be sewn or glued together. A doll has been made by sewing sheets of the invention together. In addition, a bag was made by sewing sheets together. An orange hat was made by gluing some orange-dyed sheets together.

After the composition of the invention is microwave-treated, the composition is shaped into an object. The composition of the invention may be manually shaped into an object with the hands of the artist being coated with a mineral-oil-containing composition. Then, the shaped, microwave-treated material composition is cured. The mineral-oil-containing composition can be cold cream.

The shaped, microwave-treated material composition may be cured at room temperature. Alternatively, the shaped, microwave-treated material composition is cured at an elevated temperature in an oven.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved sculpturing material that is low in cost, relatively simple in design and operation, and which may advantageously be cured in a variety of curing environments. With the invention, a sculpturing material is provided which has a substantially homogeneous consistency and a substantially homogeneous composition. With the invention, a sculpturing material is provided which is composed of ingredients that are readily available. With the invention, a sculpturing material is provided which is a blend of a relatively small number of ingredients. With the invention, a sculpturing material is provided which is capable of being prepared with a wide variety of readily available and compatible coloring materials. With the invention, a sculpturing material is provided which requires a relatively small space in storage which is in contrast with the relatively large space occupied by the sculpturing material when the sculpturing material is in use. With the invention, a sculpturing material is provided which is adapted to being handled by hands of a sculptor that have an oil-based material applied thereto. With the invention, a sculpturing material is provided which is capable of being treated in a microwave oven. With the invention, a sculpturing material is provided which can be provided in the form of sheets, such that the sheets resemble sheets of cloth. With the invention, a sculpturing material is provided which is suitable for both manual forming and forming in a mold.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A method of producing a sculptured product, including the steps of:

first obtaining a quantity of pliable precursor material composition prepared by the steps of mixing together (a) a quantity of a premixed mixture of ground cellulose-containing material, plaster of paris, and starch preservative, (b) a quantity of a water-based adhesive resin, and (c) a quantity of talcum powder to form the pliable precursor material composition, second, treating the pliable precursor material composition with microwave energy, such that a pliable microwave treated material composition is formed that has a greater volume and greater pliability than the precursor material composition, third, manually shaping the microwave-treated pliable material composition, and fourth, curing the manually shaped, microwave-treated material composition.

2. The method described in claim 1 wherein the composition is treated in a 600–700 watt microwave oven for 30–40 seconds at high power.

3. The method described in claim 1 wherein the shaped, microwave-treated material composition is cured at room temperature.

4. The method described in claim 1 wherein the shaped, microwave-treated material composition is cured at an elevated temperature in an oven.

* * * * *